(12) United States Patent
McConville et al.

(10) Patent No.: US 9,464,562 B2
(45) Date of Patent: Oct. 11, 2016

(54) VARIABLE VALVE SYSTEM TO REDUCE CONDENSATION IN A CHARGE AIR COOLER

(71) Applicant: Ford Global Technologies, LLC, Dearborn, MI (US)

(72) Inventors: Gregory Patrick McConville, Ann Arbor, MI (US); Daniel Joseph Styles, Canton, MI (US); Mehdi Abarham, Berkeley, CA (US); James Alfred Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 14/148,642

(22) Filed: Jan. 6, 2014

(65) Prior Publication Data

US 2014/0325959 A1    Nov. 6, 2014

Related U.S. Application Data

(60) Provisional application No. 61/818,799, filed on May 2, 2013.

(51) Int. Cl.
*F02B 29/04* (2006.01)

(52) U.S. Cl.
CPC ....... *F02B 29/0418* (2013.01); *F02B 29/0431* (2013.01); *Y02T 10/146* (2013.01)

(58) Field of Classification Search
CPC ............ F02B 29/0418; F02B 29/0425; F02B 29/0431; Y02T 10/146
See application file for complete search history.

(56) References Cited

U.S. PATENT DOCUMENTS

| 6,055,953 A | 5/2000 | Weickel et al. |
| 2007/0175612 A1* | 8/2007 | Hendrix .............. F02B 29/0418 165/101 |
| 2010/0050997 A1* | 3/2010 | Huber ................. F02B 29/0412 123/563 |
| 2012/0018127 A1* | 1/2012 | Iwasaki .............. F02B 29/0412 165/104.14 |

FOREIGN PATENT DOCUMENTS

WO    2005033489 A1    4/2005

* cited by examiner

*Primary Examiner* — Lindsay Low
*Assistant Examiner* — Jacob Amick
(74) *Attorney, Agent, or Firm* — Julia Voutyras; Alleman Hall McCoy Russell & Tuttle LLP

(57) ABSTRACT

Methods and systems are provided for regulating air flow through a charge air cooler. In one example, an air flow regulating element may be positioned in a tank of the charge air cooler, the air flow regulating element including a cylindrical barrel valve rotatable about a rotational axis to adjust air flow through cooling tubes in the charge air cooler. A position of the barrel valve may be based on a mass air flow rate and/or a temperature at an outlet of the charge air cooler.

20 Claims, 10 Drawing Sheets

VARIABLE VALVE SYSTEM TO REDUCE CONDENSATION IN A CHARGE AIR COOLER

CROSS REFERENCE TO RELATED APPLICATION

This application claims priority to U.S. Provisional Patent Application No. 61/818,799, entitled "VARIABLE VALVE SYSTEM TO REDUCE CONDENSATION IN A CHARGE AIR COOLER," filed May 2, 2013, the entire contents of which are hereby incorporated herein by reference for all purposes.

BACKGROUND/SUMMARY

Turbocharged and supercharged engines may be configured to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Condensate (e.g., water droplets) may collect at the bottom of the CAC, or in the internal passages, and cooling turbulators. When torque is increased, such as during acceleration, increased mass air flow may strip the condensate from the CAC, drawing it into the engine and increasing the likelihood of engine misfire and combustion instability.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Another method to prevent engine misfire due to condensate ingestion includes trapping and/or draining the condensate from the CAC. While this may reduce condensate levels in the CAC, condensate is moved to an alternate location or reservoir, which may be subject to other condensate problems such as freezing and corrosion.

The inventors herein have recognized that under various pressure conditions charge air condensate may be stripped from the cooling tubes of the charge air cooler before excess condensation can build up if the air flow velocity through the CAC remains above a minimum threshold. Thus, in one example, the issues described above may be addressed by an air flow regulating element positioned in a tank of the CAC, the air flow regulating element adjustable to alter a number of cooling tubes in the CAC through which air flows. In one example, the air flow regulating element may include a cylindrical barrel valve rotatable about a rotational axis to adjust air flow through cooling tubes within the CAC. Specifically, the cooling tubes may include a first set of cooling tubes wherein air flow through the first set of cooling tubes is always flowing. The cooling tubes may further include a second set of cooling tubes wherein air flow through the second set of cooling tubes is regulated with the air flow regulating element. In an alternate embodiment, air flow through the first set of cooling tubes may also be regulated with the air flow regulating element and air flow may only be flowing through the first set of cooling tubes when air is not flowing through the second set of cooling tubes. A controller may rotate the barrel valve into different positions to increase or decrease an air flow velocity through the cooling tubes of the CAC. In some examples, the position of the barrel valve may be adjusted based on a mass air flow rate and/or a temperature at an outlet of the CAC.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
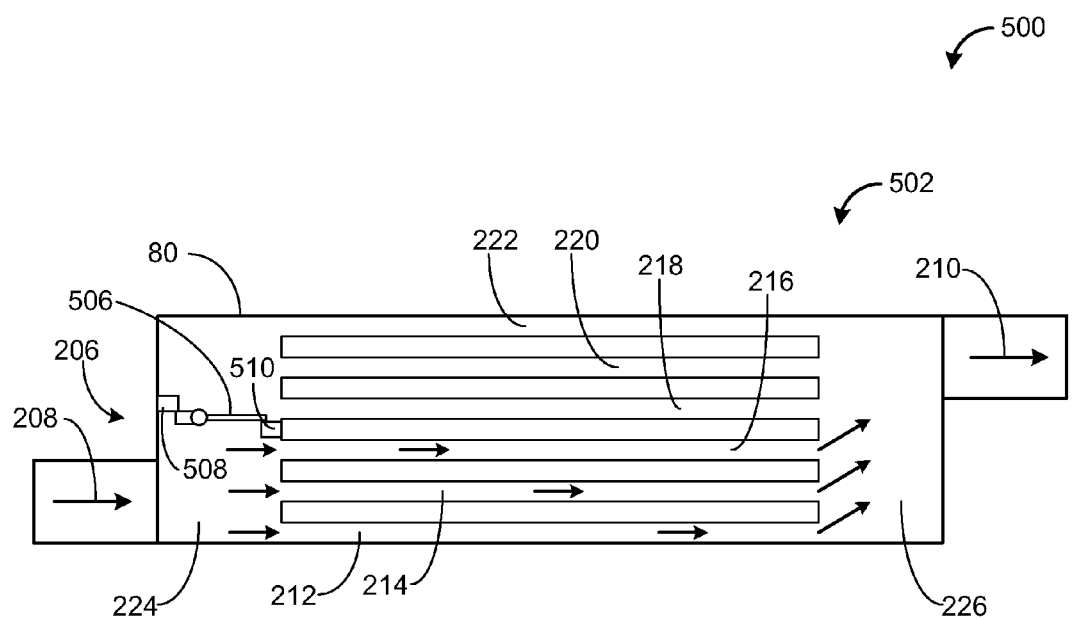
FIG. 5 is a schematic of a fourth embodiment of an air flow regulating element in a charge air cooler.
Figure 5:
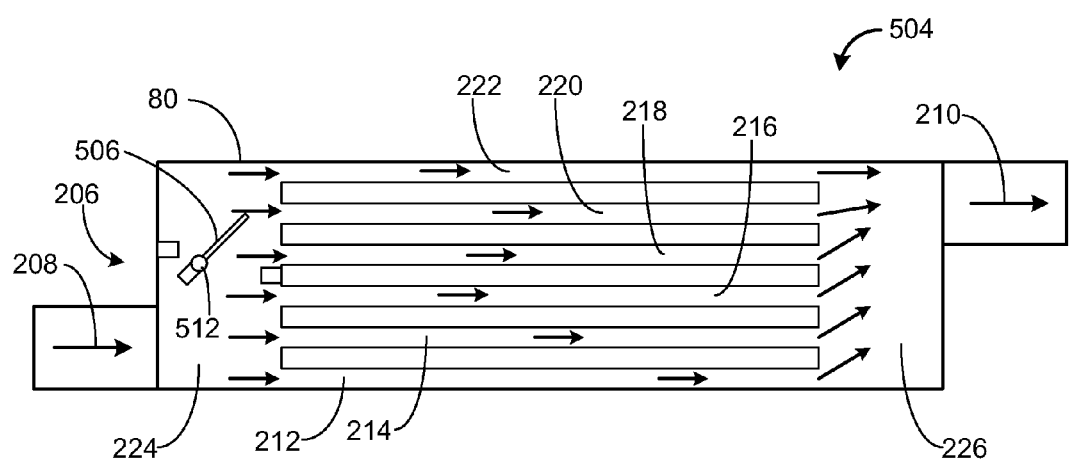
Figure 5:
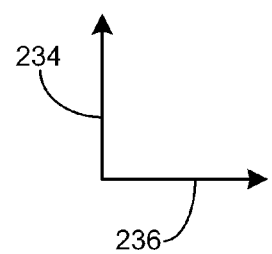
Figure 6:
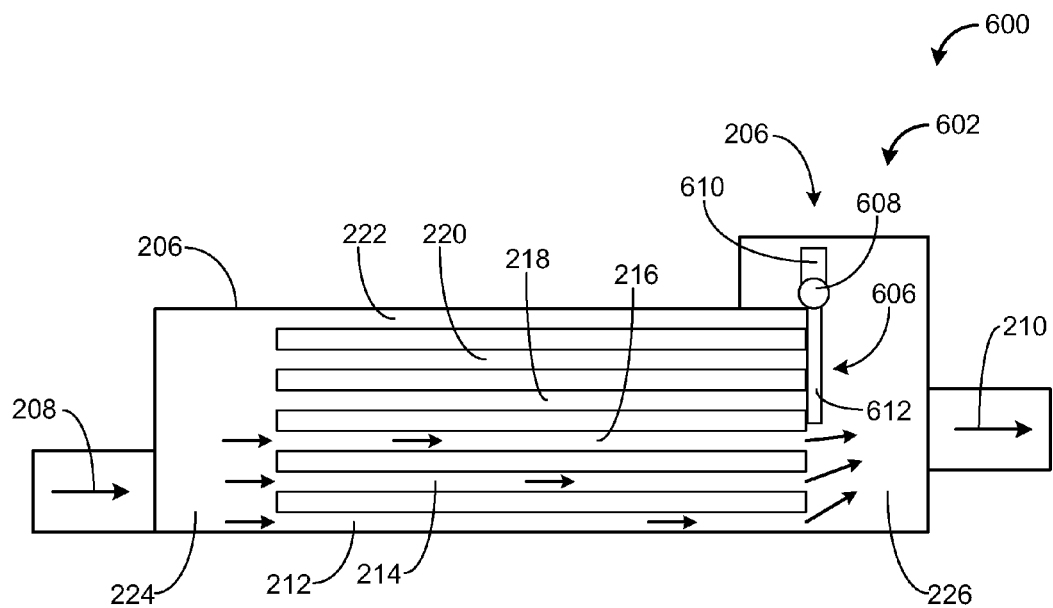
FIG. 6 is a schematic of a fifth embodiment of an air flow regulating element in a charge air cooler.
Figure 6:
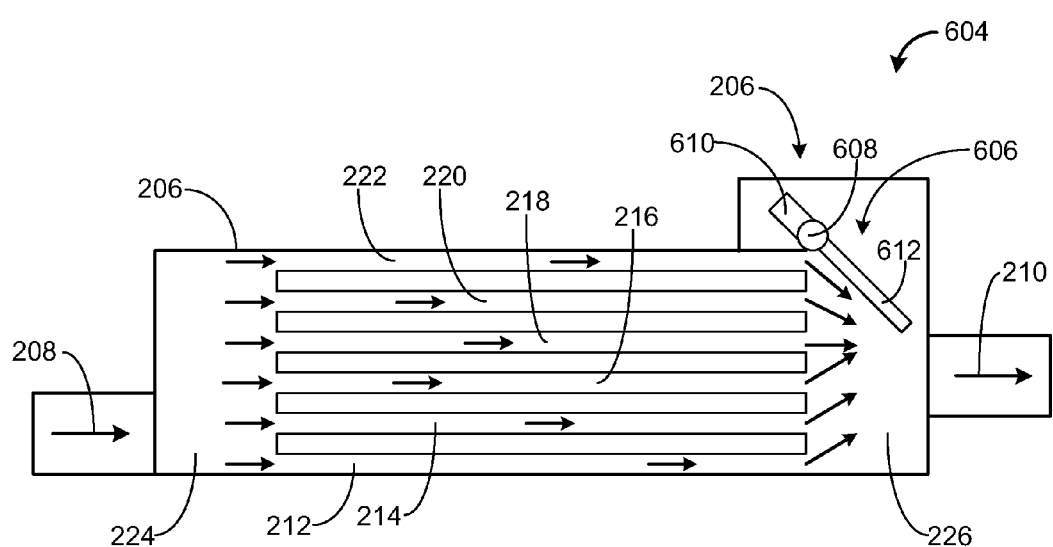
Figure 6:
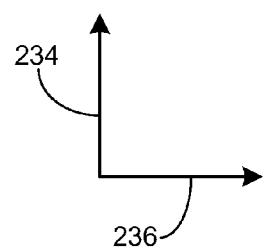
Figure 7:
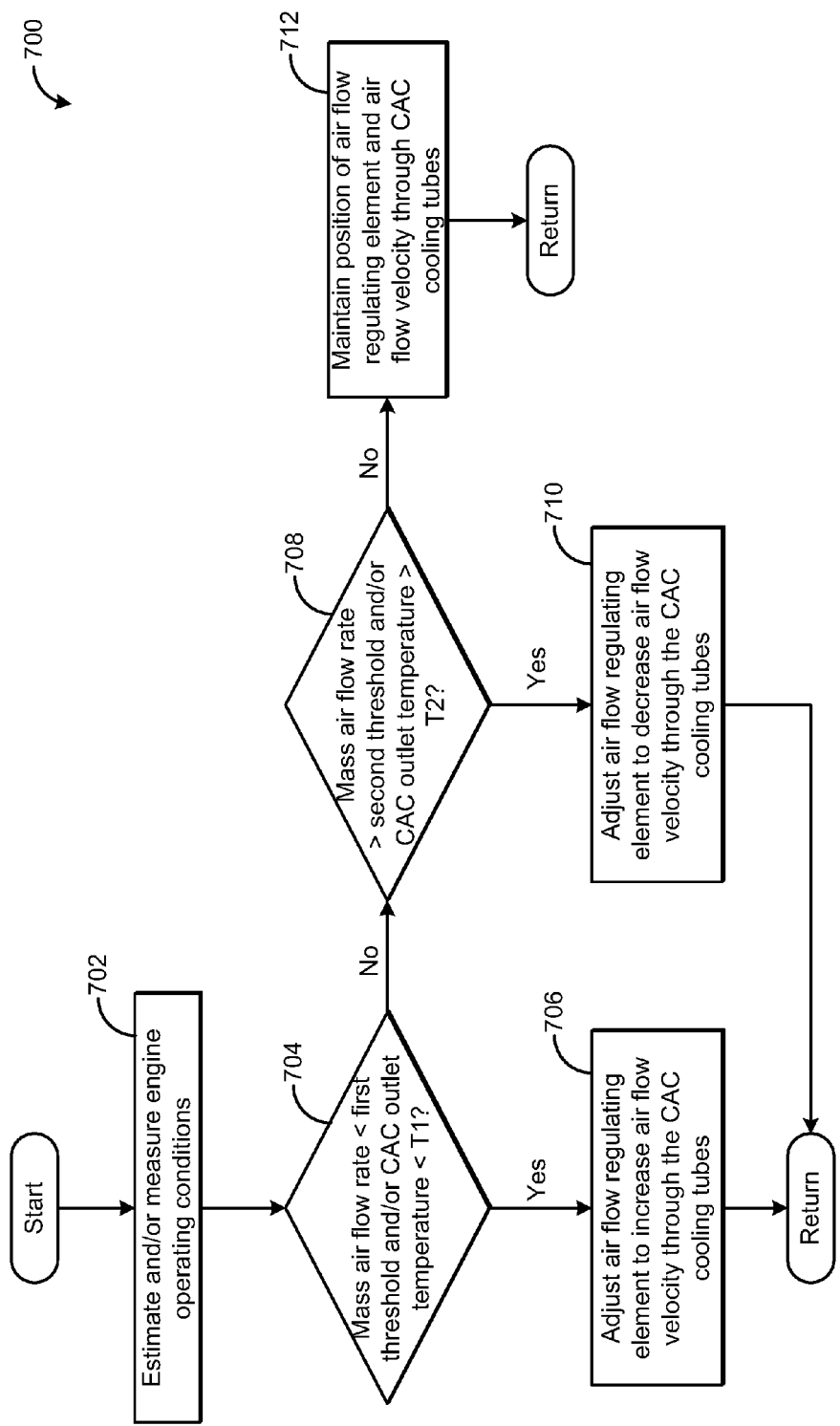
FIG. 7 is a flow chart illustrating a method for adjusting air flow through a charge air cooler.

The following description relates to systems and methods for regulating air flow through a charge air cooler (CAC). A CAC in an engine system, such as the engine system shown in FIG. 1, may include an air flow regulating element to control a velocity of charge air flowing through cooling tubes of the CAC. Charge air may enter a plurality of cooling tubes within the CAC through an inlet tank of the CAC. Then, cooled charge air may exit the plurality of cooling tubes and enter an outlet tank of the CAC. The air flow regulating element may be positioned within the inlet tank or the outlet tank. Different embodiments of the air flow regulating element within the CAC are shown at FIGS. 2-6 and FIGS. 8-10. A position of the air flow regulating element may be adjusted to control air flow through a subset of the plurality of cooling tubes. In one example, the air flow regulating element may be adjusted passively based on an air flow pressure. In another example, as shown at FIG. 7, an engine controller may adjust the position of the air flow regulating element to increase or decrease a number of active (e.g., flowing charge air) cooling tubes based on engine operating conditions. In this way, adjusting the position of the air flow regulating element may adjust an air flow rate (e.g., velocity) through the cooling tubes of the CAC. By maintaining the air flow velocity through the cooling tubes of the CAC above a threshold, condensate accumulation and potential engine misfire events may be reduced.

Figure 1:
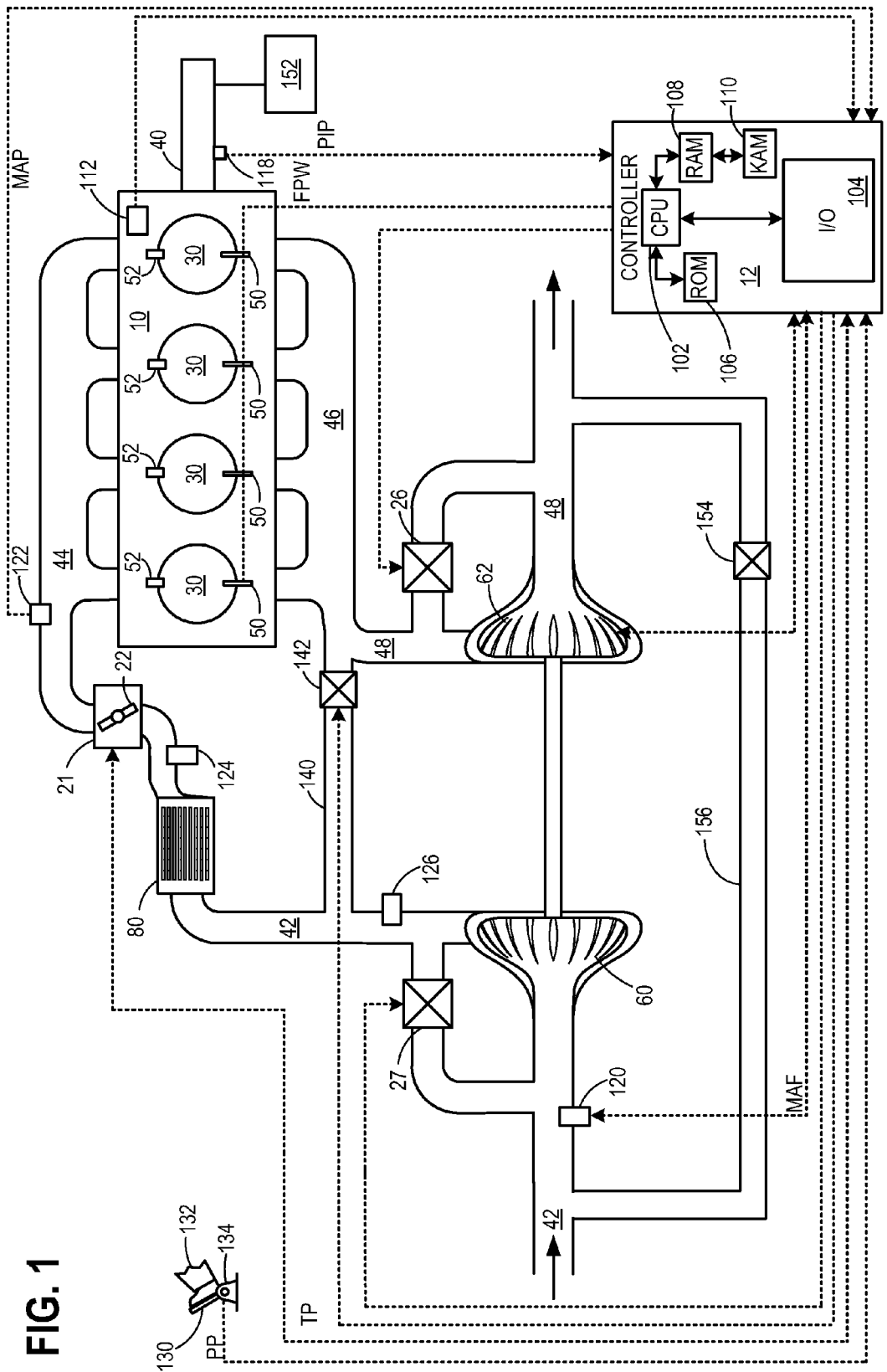
FIG. 1 is a schematic diagram of an example engine system including a charge air cooler.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle and use engine output torque to propel the automobile. The crankshaft 40 may also be used to drive an alternator 152.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 156. A low pressure EGR valve 154 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler, as described in more detail below.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44.

Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur.

As shown in FIGS. 2-6 and FIGS. 8-10 and discussed further below, the CAC 80 may include a plurality of internal cooling tubes through which charge air flows. Under various air flow conditions, condensate formed within cooling tubes may be stripped from the cooling tubes before excess condensation can build up if the charge air flow rate remains above a minimum threshold. For example, a minimum air velocity of 12-15 m/s at various engine speeds may tend to remove water continuously and prevent excess condensation in the CAC 80. In other examples, a minimum air velocity greater or less than the 12-15 m/s range may remove water continuously while preventing excess condensation in the CAC 80. Further, the rate of water stripping may increase with higher charge air flow rates. However, at slower engine speeds, the charge air flow rate (e.g., air flow velocity) through the cooling tubes may be too low to prevent excess condensation buildup. Accordingly, the CAC 80 may include an air flow regulating element to adjust the air flow velocity through the cooling tubes. As discussed further below with regard to FIGS. 2-10, the air flow regulating element may be adjusted to shut off air flow through a subset of cooling tubes in order to increase the air flow velocity through the remaining cooling tubes. In this way, condensate accumulation in the CAC may be reduced and condensate may be blown out of the CAC at a controlled rate which may not affect engine combustion.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIG. 7.

The system of FIG. 1 provides for an engine system including an engine with an intake manifold, a throttle positioned upstream of the intake manifold, a turbocharger with a turbine operable to drive a compressor, a charge air cooler positioned upstream of the throttle and downstream of the compressor, an air flow regulating element positioned in one or more of an inlet tank and an outlet tank of the charge air cooler, and a controller with computer readable instruction for adjusting a position of the air flow regulating element within the charge air cooler based on a velocity of charge air entering the charge air cooler. The velocity of the charge air entering the charge air cooler may be based on a mass air flow rate. Further, the adjusting may be based on a temperature of the charge air exiting the charge air cooler.

Embodiments of an air flow regulating element in a CAC 80 installed in an engine system, such as the engine system shown in FIG. 1, are illustrated in FIGS. 2-6 and FIGS. 8-10. As described above, the CAC 80 includes a plurality of cooling tubes. As shown in FIGS. 2-6 and FIGS. 8-10, the plurality of cooling tubes include a first cooling tube 212, a second cooling tube 214, a third cooling tube 216, a fourth cooling tube 218, a fifth cooling tube 220, and a sixth cooling tube 222. Though FIGS. 2-6 and FIGS. 8-10 show the CAC 80 having six cooling tubes, the CAC 80 may have any number of cooling tubes, greater than 1. For example, in an alternate embodiment, the CAC 80 may include 10 cooling tubes. In another embodiment, the CAC 80 may include four cooling tubes. The plurality of cooling tubes may be separated into subsets of two or more sets of cooling tubes. For example, in a first set of cooling tubes, charge air may always flow through the tubes. As such, an air flow velocity through the first set of cooling tubes may always be greater than zero if the mass air flow is greater than zero. In a second set of cooling tubes, charge air may not always flow through the cooling tubes. As described further below, the air flow regulating element 206 may be adjusted to block air flow from entering and/or exiting one or more cooling tubes of the second set of cooling tubes.

Thus, the air flow regulating element 206 may be adjusted to increase or decrease an amount or number of cooling tubes which receive and/or output charge air. The cooling tubes through which charge air flows (e.g., air flow velocity is greater than zero) may be referred to as active (e.g., activated) cooling tubes while the blocked cooling tubes may be referred to as inactive (e.g., deactivated) cooling tubes. Further, the air flow regulating element 206 may be adjusted to increase or decrease the air flow velocity of the charge air traveling through the active cooling tubes. By blocking or deactivating a portion of the cooling tubes, the air flow velocity through the active cooling tubes may increase. Increasing the air flow velocity through active cooling tubes may reduce condensate accumulation within the tubes, thereby reducing engine misfire events due to ingesting large amounts of water.

Figure 2:
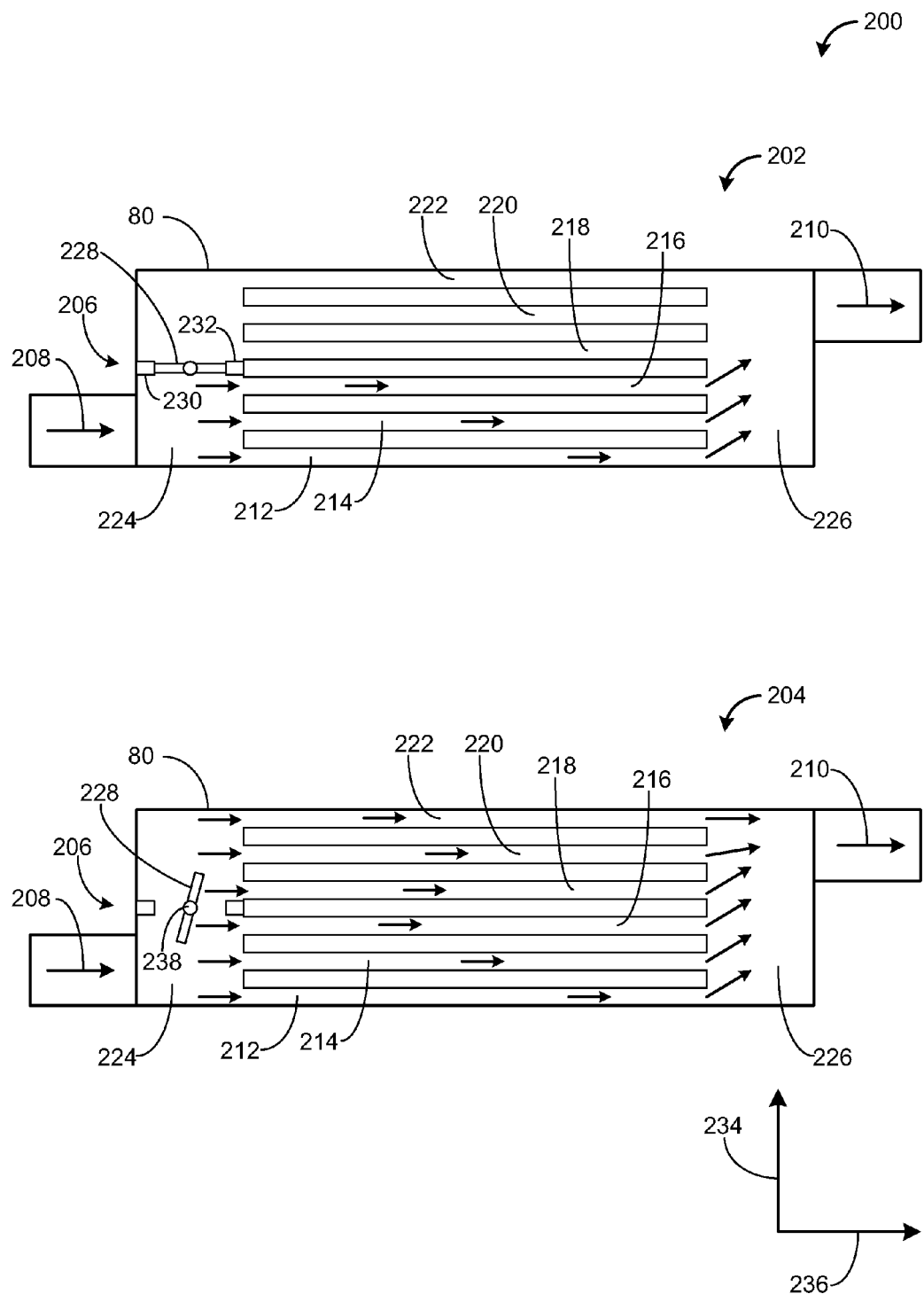
FIG. 2 is a schematic of a first embodiment of an air flow regulating element in a charge air cooler.
Figure 3:
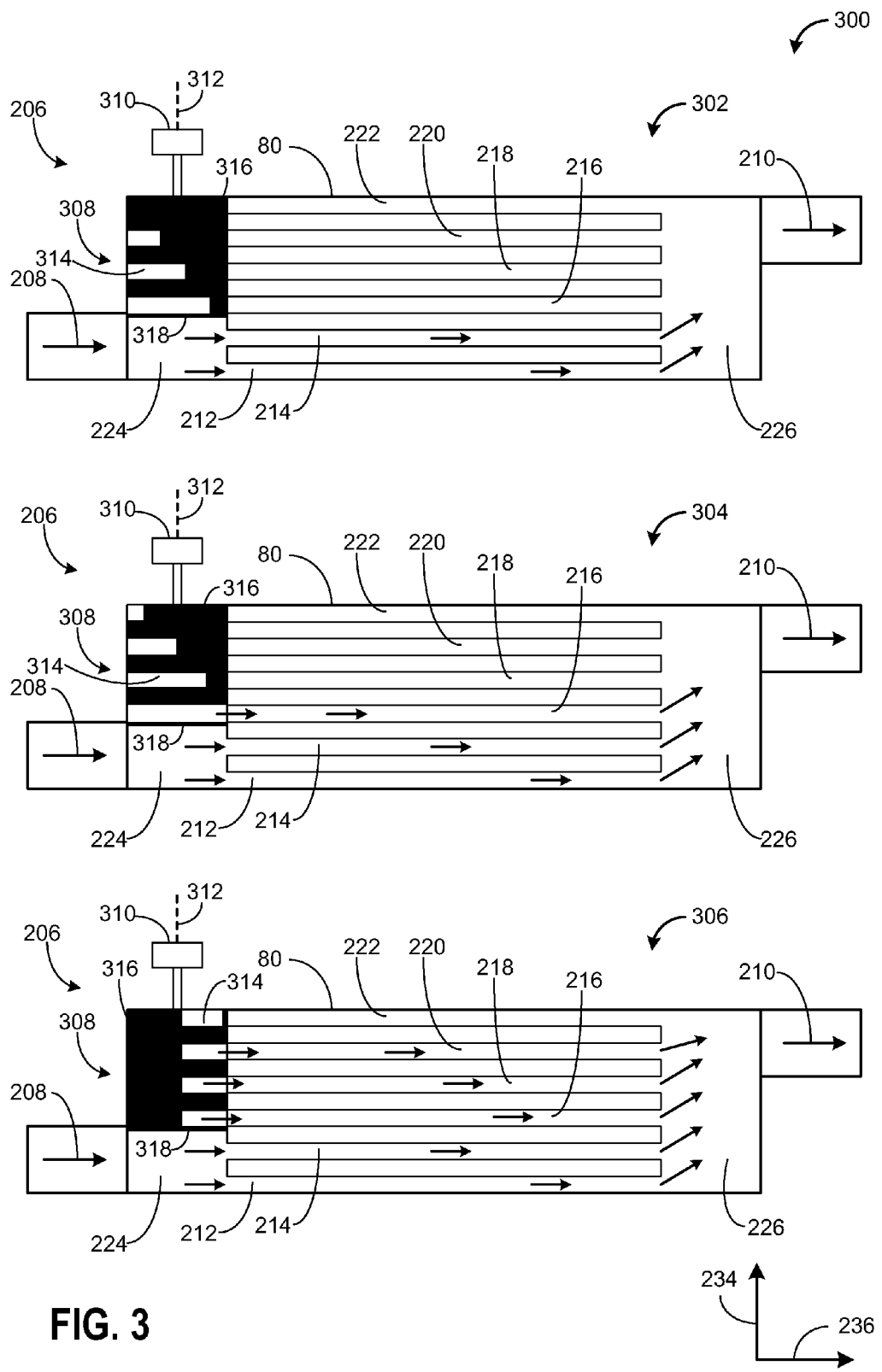
FIG. 3 is a schematic of a second embodiment of an air flow regulating element in a charge air cooler.
Figure 4:
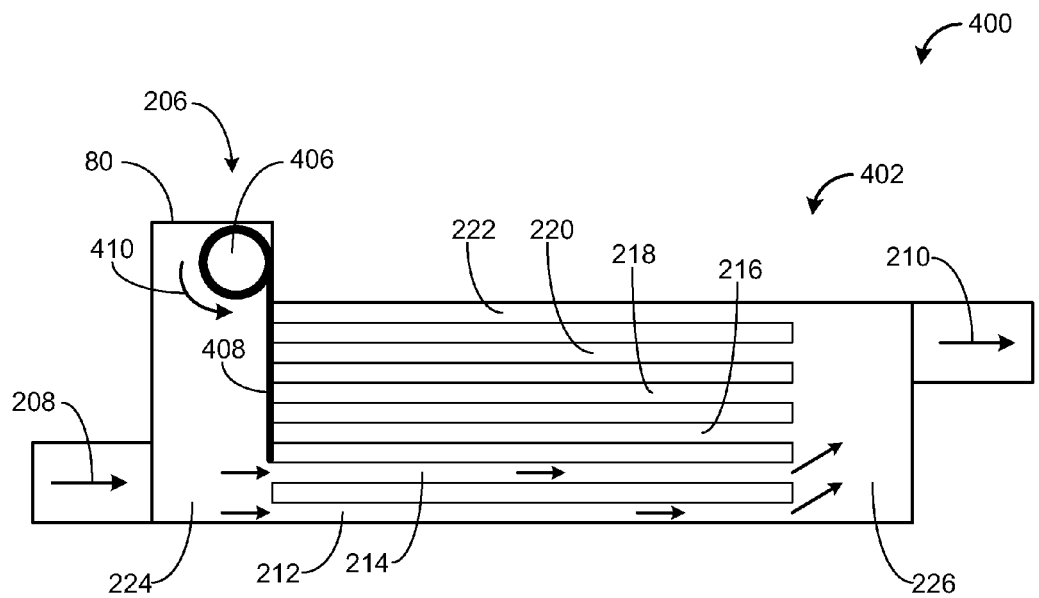
FIG. 4 is a schematic of a first view of a third embodiment of an air flow regulating element in a charge air cooler.
Figure 4:
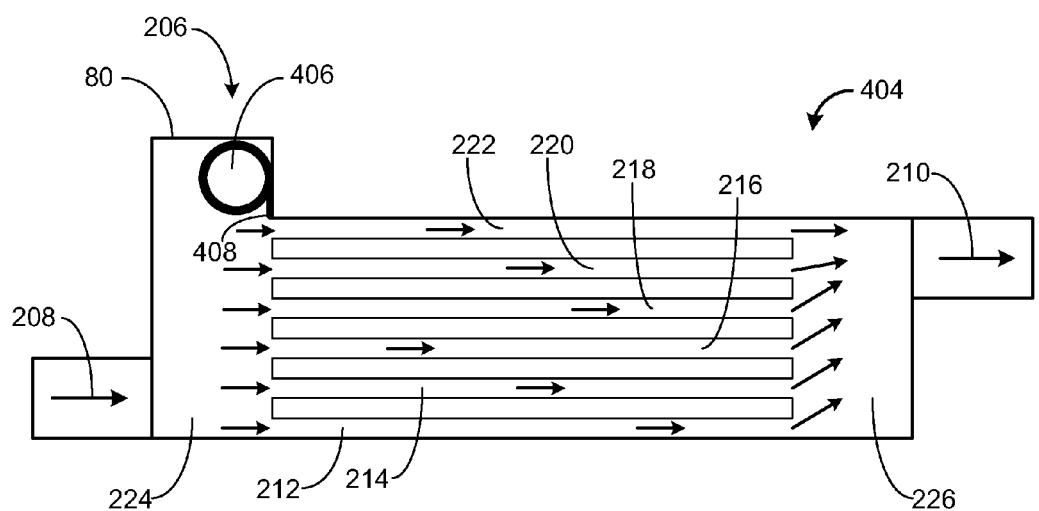
Figure 4:
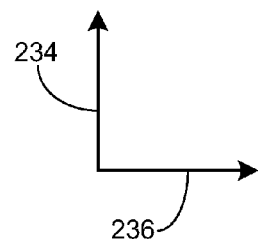

In one example, the air flow regulating element 206 may be adjusted actively through an actuator and controller. For example, an engine controller (such as the controller 12 shown in FIG. 1) may adjust a position of the air flow regulating element 206 by actuating an actuator coupled to the air flow regulating element 206. Examples of an actively controlled air flow regulating element 206 are shown in FIGS. 2-4. In another example, the air flow regulating element 206 may be adjusted passively based on an air flow velocity and/or pressure of the charge air entering the CAC 80. For example, as the air flow velocity and air flow pressure entering the CAC 80 increases, the higher air flow pressure may push against and open the air flow regulating element 206, thereby allowing air flow to enter and/or exit the second set of cooling tubes. Examples of a passively controlled air flow regulating element 206 are shown in FIGS. 5-6.

Charge air from a compressor (such as the compressor 60 shown in FIG. 1) enters the CAC 80 at arrow 208 and flows into an inlet tank 224 of the CAC 80. The charge air then enters the open or active cooling tubes at a first end (e.g., inlet end) of the cooling tubes. As the charge air passes through the cooling tubes (e.g., cooling tubes 212-222), CAC coolant or air passing through the opposite side of the cooling tubes cools the charge air. As such, cooled charge air exits the cooling tubes at a second end (e.g., outlet end) of the cooling tubes and enters an outlet tank 226 of the CAC 80. The cooled charge air finally exits the CAC 80 at arrow 210.

Turning now to FIG. 2, a first embodiment of an air flow regulating element 206 in a CAC 80 is shown in schematic 200. FIG. 2 is a cross-section of the CAC 80 and includes an axis system showing a vertical axis 234 and a horizontal axis 236. The vertical axis 234 may be defined with respect to a ground on which a vehicle in which the engine is installed sits. However, in some embodiments the CAC 80 may be tilted relative to the ground and the vertical axis 234. As shown in FIG. 2, the air flow regulating element 206 includes a valve 228. The valve 228 may be positioned within the inlet tank 224 of the CAC 80. Further, the valve may be adjustable between an open and a closed position. In the closed position, as shown at 202, ends of the valve 228 are positioned adjacent to and contact two projections. Specifically, a first end of the valve 228 contacts a first projection 230 and a second end of the valve 228 contacts a second projection 232 when the valve 228 is in the closed position. The ends of the valve 228 may be positioned against the corresponding projection such that no air, or an insignificant flow rate of air, may pass from an upstream side to a downstream side of the valve 228. The first projection 230 is coupled to a wall of the CAC 80 and the second projection 232 is coupled to an internal wall of the CAC 80, between adjacent cooling tubes.

When the valve 228 is in the closed position (shown at 202), charge air may flow through a first set of cooling tubes and not through a second set of cooling tubes. As shown in FIG. 2, the first set of cooling tubes includes the first cooling tube 212, the second cooling tube 214, and the third cooling tube 216. The second set of cooling tubes includes the fourth cooling tube 218, the fifth cooling tube 220, and the sixth cooling tube 222. The valve 228, the first projection 230, and the second projection 232 are positioned in the inlet tank 224 at a level, with respect to the vertical axis 234, between the first set of cooling tubes and the second set of cooling tubes. As such, charge air may only enter the first set of cooling tubes, at the first end of the cooling tubes, when the valve 228 is in the closed position. The closed valve 228 blocks charge air from entering the first end of the second set of cooling tubes. As a result, an air flow rate (e.g., velocity) of the charge air flowing through the first set of cooling tubes may be larger when the valve 228 is closed than if it were open under the same mass air flow conditions.

In alternate embodiments, the first set of cooling tubes and the second set of cooling tubes may include more or less than three cooling tubes. Further, a number of cooling tubes in the first set of cooling tubes may not equal a number of cooling tubes in the second set of cooling tubes. For example, the first set of cooling tubes may include two cooling tubes and the second set of cooling tubes may include five cooling tubes. In another embodiment, the first set of cooling tubes may include four cooling tubes and the second set of cooling tubes may include two cooling tubes.

In the open position, as shown at 204, ends of the valve 228 are moved away from the two projections 230 and 232. The ends of the valve 228 no longer contact the projections, thereby allowing air to flow past the valve to the first ends of the second set of cooling tubes. Thus, in the open position, charge air may flow through both the first set of cooling tubes and the second set of cooling tubes. The valve 228 may move from the closed position to the open position and/or from the open position to the closed position by rotating around a valve pivot point 238, or shaft. In one example, the valve 228 may be actively adjusted via an actuator (not shown) coupled to the valve 228. Further, a controller (such as controller 12 in FIG. 1) may actuate the actuator to open or close the valve 228 as shown. The controller may actuate the valve 228 to open and/or close in response to various engine operating conditions, including a mass air flow rate and a temperature of the charge air exiting the CAC 80. As such, the controller may adjust the position of the valve 228 to maintain a minimum air flow velocity through the cooling tubes of the CAC 80 and control an efficiency of the CAC 80. Methods for adjusting the air flow regulating element 206 based on engine operating conditions are discussed further below with regard to FIG. 7.

FIG. 3 shows a schematic 300 of a second embodiment of an air flow regulating element 206 in a CAC 80. FIG. 3 is a cross-section of the CAC 80 and contains similar parts as described above with regard to FIG. 2. Further, FIG. 3 includes the axis system showing the vertical axis 234 and the horizontal axis 236. As shown in FIG. 3, the air flow regulating element 206 includes a barrel valve 308. The barrel valve 308 may be positioned within the inlet tank 224 of the CAC 80 and proximate to the second set of cooling tubes. The barrel valve 308 may be a cylinder with a circular cross-section. As such, the barrel valve 308 has an outer diameter, in the direction of the horizontal axis 236, which spans across the inlet tank 224 from a wall of the CAC 80 to the first end of the cooling tubes. Further, the barrel valve 308 has a height, in the direction of the vertical axis 234. The height of the barrel valve 308 covers and extends along a height of the second set of cooling tubes, at a first end of the second set of cooling tubes. As such, a bottom or base 318 of the barrel valve 308 is positioned vertically between the first set of cooling tubes and the second set of cooling tubes. The base 318 may also be referred to as an inlet to the barrel valve 308. As such, charge air entering the inlet tank 224 may enter the barrel valve 308 at the base 318. As shown in FIG. 3, the first set of cooling tubes includes the first cooling tube 212 and the second cooling tube 214. The second set of cooling tubes includes the third cooling tube 216, the fourth cooling tube 218, the fifth cooling tube 220, and the sixth cooling tube 222.

In alternate embodiments, the first set of cooling tubes and the second set of cooling tubes may include more or less than two and four cooling tubes, respectively. Further, the barrel valve 308 may cover, or span, more or less than four cooling tubes. For example, the first set of cooling tubes may include three cooling tubes and the second set of cooling tubes may include five cooling tubes. In another embodiment, the first set of cooling tubes may include three cooling tubes and the second set of cooling tubes may include three cooling tubes.

Figure 8:
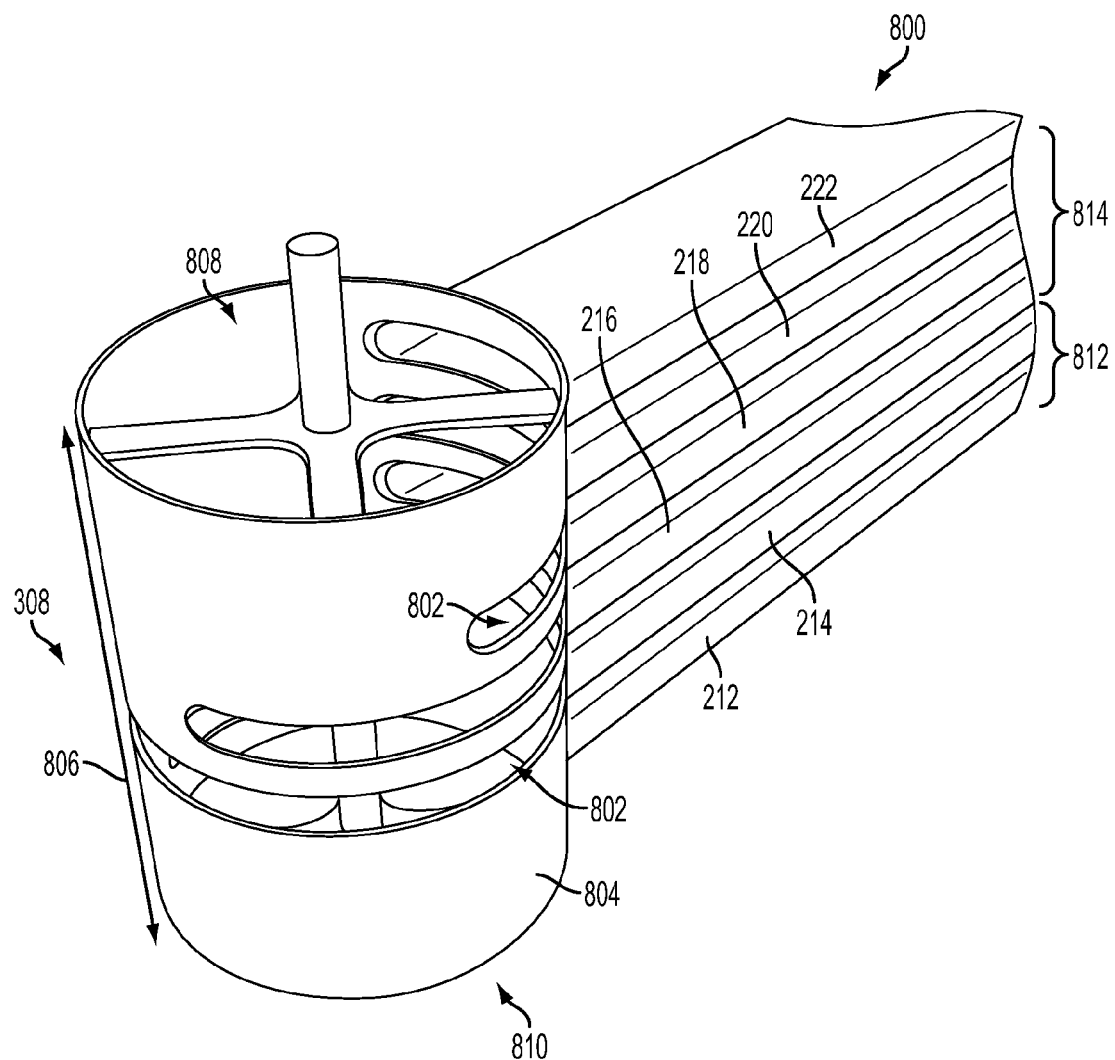
FIGS. 8-9 are schematics of a barrel valve in a charge air cooler.
Figure 9:
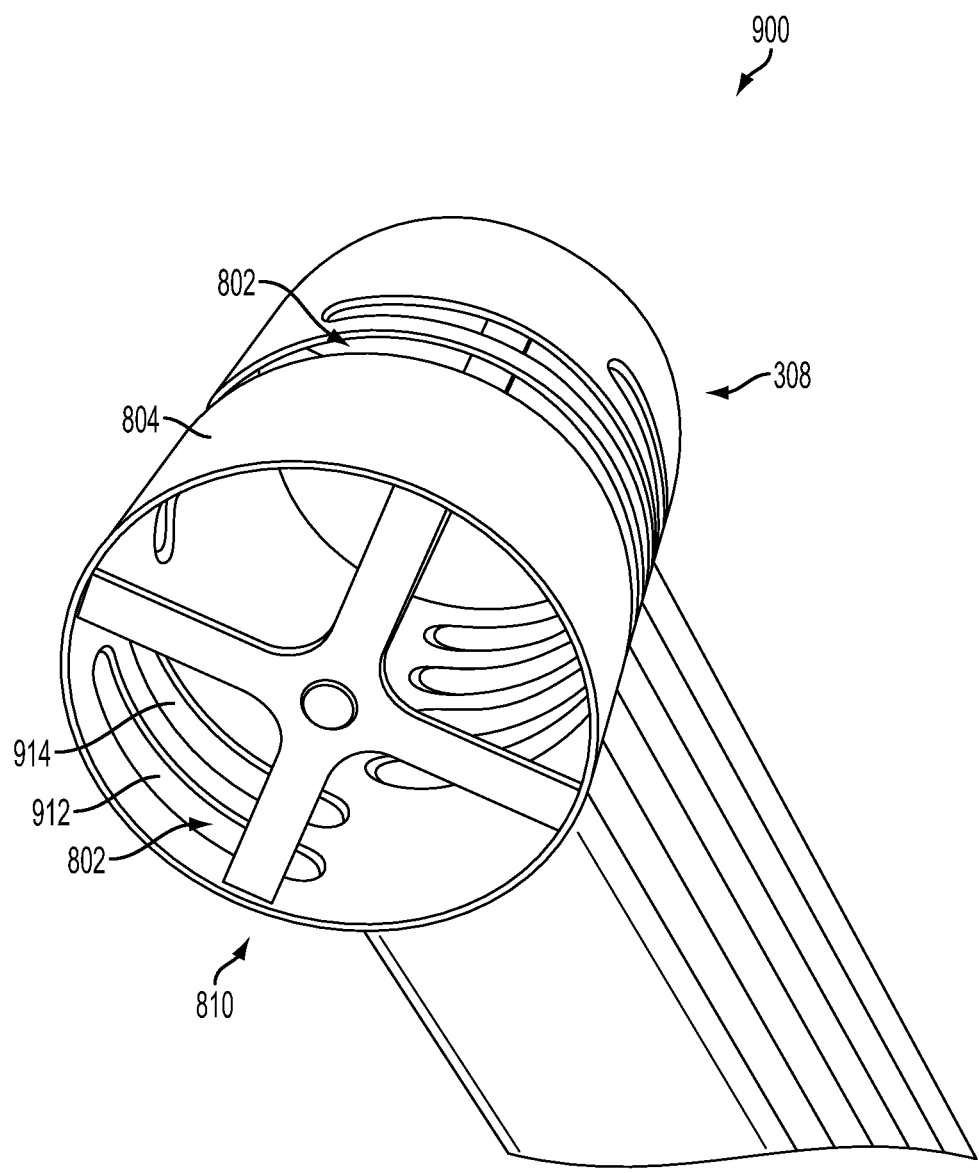

FIGS. 8-9 show one example of the barrel valve 308. As shown in FIGS. 8-9, the barrel valve 308 is a hollow cylinder including a series of slots 802 of different lengths in an outer wall 804 and along the height 806 of the barrel valve 308. Charge air entering the CAC may enter the barrel valve 308 through the top 808 and/or the base (e.g., bottom) 810 of the barrel valve 308. For example, in the first embodiment shown in FIG. 3, charge air may enter the barrel valve 308 through only the base of the barrel valve 308. In another embodiment, charge air may enter the barrel valve 308 through both the top 808 and the base 810 of the barrel valve 308. In yet another example, charge air entering the CAC may enter the barrel valve 308 through only the top 808 of the barrel valve 308. The location at which charge air enters the barrel valve 308 may be based on a type and arrangement of the CAC.

When the slots 802 align with the first end, or inlet openings, of the cooling tubes (e.g., cooling tubes 212-222) charge air within the barrel valve 308 may enter the corresponding cooling tube. However, when the slots 802 are not aligned with the cooling tubes the outer wall covers the first end of the cooling tubes, thereby blocking charge air from entering and passing through the blocked cooling tubes. Each slot may line up vertically with a cooling tube. Said another way, a corresponding slot and cooling tube may be positioned at a same level, with respect to the vertical axis 234, in the CAC. Thus, one slot may correspond to one cooling tube. Each slot may be a different length such that different discrete combinations of cooling tubes may be covered or uncovered for different positions of the barrel valve 308.

A length of each slot 802 may increase from a first end of the barrel valve 308 to a second end of the barrel valve 308. For the embodiment of the barrel valve described with respect to FIG. 3, a length of each slot 802 increases from the top 808 (e.g., first end) to the base 810 (e.g., second end) of the barrel valve. As such, the slot closest to the top 808 of the barrel valve 308 may be the shortest of all the slots 802 and the slot closest to the base 810 of the barrel valve 310 may be the longest of all the slots 802. In an alternate embodiment, the slots of the barrel valve 308 may be reversed such that the length of each slot 802 increases from the base 810 (e.g., first end) to the top 808 (e.g., second end) of the barrel valve. In this embodiment, the slot closest to the top 808 of the barrel valve 308 may be the longest of all the slots 802 and the slot closest to the base 810 of the barrel valve 310 may be the shortest of all the slots 802.

Returning to FIG. 3, the slots of the barrel valve 308 may allow air flow (white areas shown at 314) and the outer wall 804 (e.g., solid portions) portions without slots may block air flow (dark areas shown at 316). When the outer wall 804 is positioned in front of the first end of the cooling tubes, no air flow may enter the blocked cooling tubes. However, when the slots are aligned with the first end of the cooling tubes, charge air may enter the unblocked cooling tubes. The slots may be staggered and be different lengths such that the slot lengths are different fractions of a circumference of the barrel valve 308.

The barrel valve 308 may be a multiple position valve. Specifically, the barrel valve 308 may block and stop air flow from entering anywhere between zero and all of the cooling tubes in the second set of cooling tubes. For example, in fully opened positioned (not shown in FIG. 3), the barrel valve 308 may not block any of the cooling tubes in the second set of cooling tubes. Thus, charge air entering the CAC 80 may enter the first end of all of the cooling tubes (e.g., cooling tubes 212-222). In a fully closed position, as shown at 302, the barrel valve 308 may cover and block all of the cooling tubes in the second set of cooling tubes (e.g., block the third cooling tube 216 through the sixth cooling tube 222). In this position, none of the slots are aligned with the inlet openings of the cooling tubes. As such, no air flow may enter and pass through the second set of cooling tubes. However, air flow may pass through and be cooled by the first set of cooling tubes. In another example, as shown at 304, the barrel valve 308 may block all but one of the cooling tubes in the second set of cooling tubes. In this example, the slot corresponding to the third cooling tube 216 is aligned with the inlet opening of the third cooling tube 216. As a result, charge air may enter the first end of the third cooling tube 216 (e.g., first cooling tube in the second set of cooling tubes). However, the barrel valve 308 blocks charge air from entering the fourth cooling tube 218, fifth cooling tube 220, and sixth cooling tube 222 (e.g., last three cooling tubes in the second set of cooling tubes). In yet another example, as shown at 306, the barrel valve 308 may block only one cooling tube in the second set of cooling tubes. In this example, the only blocked cooling tube is the last cooling tube, or sixth cooling tube 222, in the second set of cooling tubes. The slots corresponding to the third cooling tube 216, fourth cooling tube 218, and fifth cooling tube 220 are all aligned with inlet openings to the corresponding cooling tubes. As such, air flow may enter the first end and pass through the first set of cooling tubes and all the cooling tubes except for the sixth cooling tube 222 in the second set of cooling tubes. In this way, the barrel valve 308 may be adjustable into a plurality of positions between fully opened and fully closed.

The barrel valve 308 is rotatable about a rotational axis 312 (e.g., axis of rotation). The rotational axis 312 may be in the direction of the vertical axis 234 and perpendicular to the cooling tubes. Specifically, the rotational axis 312 is perpendicular to a central flow direction of the CAC cooling tubes (e.g., cooling passages). Further, the rotational axis 312 may be in the direction of airflow through the inlet tank 224. In one example, the barrel valve 308 may be rotated about the rotational axis 312 by a rotary actuator 310. The rotary actuator 310 may be controlled by a controller, such as controller 12 shown in FIG. 1. As such, the controller may adjust the position of the barrel valve to variably cover and uncover different cooling tubes of the charge air cooler in different discrete combinations of cooling tubes. Rotating the barrel valve 308 adjusts the barrel valve 308 into the different positions described above. Each position of the barrel valve 308 uncovers a different number of cooling tubes in the second set of cooling tunes to allow air flow through the uncovered tubes. Further, rotating the barrel valve 308 may progressively uncover or block the cooling tubes in the second set of cooling tubes. For example, starting from a fully opened position (e.g., none of the cooling tubes in the second set of cooling tubes are blocked), the controller may actuate the rotary actuator 310 to rotate the barrel valve 308 in a first direction to progressively cover or block the cooling tubes in the second set of cooling tubes. As the barrel valve 308 rotates further in the first direction, a larger number of the cooling tubes in the second set of cooling tubes are blocked, thereby reducing the number of active cooling tubes. Likewise, from a fully closed position, as shown at 302, all the cooling tubes in the second set of cooling tubes are blocked, thereby not allowing air flow through the blocked cooling tubes. The controller may actuate the rotary actuator 310 to rotate the barrel valve 308 in a second direction, opposite the first direction, to uncover the first cooling tube (e.g., the third cooling tube 216) of the second set of cooling tubes, as shown at 304. As the barrel valve 308 continues to rotate further in the second direction, more of the cooling tubes in the second set of cooling tubes are progressively uncovered (e.g., first 0, then 1, then 2, then 3, then all of the cooling tubes in the second set of cooling tubes are uncovered).

The controller may actuate the barrel valve 308 to cover a different number of cooling tubes in the second set of cooling tubes in response to various engine operating conditions, including a mass air flow rate and a temperature of the charge air exiting the CAC 80. As such, the controller may adjust the position of the barrel valve 308 to maintain a minimum air flow velocity through the cooling tubes of the CAC 80 and control an efficiency of the CAC 80. Methods for adjusting the air flow regulating element 206 based on engine operating conditions are discussed further below with regard to FIG. 7.

Returning to FIGS. 8-9, a second embodiment of the barrel valve 308 is shown. Specifically, schematic 800 shows a first isometric view of the barrel valve 308. Schematic 900 shows a second isometric view of the barrel valve 308 from the bottom or base of the barrel valve 308. As shown in FIG. 8, the CAC may include six cooling tubes including a first set of cooling tubes 812 and a second set of cooling tubes 814. As in FIG. 3, the first set of cooling tubes 812 may include the first cooling tube 212 and the second cooling tube 214. The second set of cooling tubes may include the third cooling tube 216, the fourth cooling tube 218, the fifth cooling tube 220, and the sixth cooling tube 222. In alternate examples, the CAC may include more or less than six cooling tubes. Additionally, in alternate examples, the first set of cooling tubes 812 may include more or less than two cooling tubes and the second set of cooling tubes 814 may include more or less than four cooling tubes.

As shown in FIGS. 8-9, the height 806 of the barrel valve 308 extends along a first height of the first set of cooling tubes 812 and a second height of the second set of cooling tubes 814. As such, the height 806 of the barrel valve 308 is positioned proximate to and covers the first set of cooling tubes 812 and the second set of cooling tubes 814 at the first end of the cooling tubes.

A first slot 912 corresponding to the first cooling tube 212 of the first set of cooling tubes 812 and a second slot 914 corresponding to the second cooling tube 214 of the first set of cooling tubes 812 have a first length. Further the first slot 912 and the second slot 914 may be staggered from all of the slots corresponding to the cooling tubes in the second set of cooling tubes 814. Specifically, the slots corresponding to the first set of cooling tubes 812 do not line up with any of the slots of the second set of cooling tubes 814. As such, when the barrel valve 308 is rotated about its rotational axis (e.g., rotational axis 312 shown in FIG. 3) into a position such that the first slot 912 and the second slot 914 are aligned with their corresponding cooling tubes, the slots corresponding to the second set of cooling tubes 814 are not aligned with their respective cooling tubes. In this position, charge air may only flow through the first set of cooling tubes 812 while airflow through the second set of cooling tubes 814 is blocked by the outer wall 804 of the barrel valve 308.

In this embodiment, the first set of cooling tubes 812 (e.g., bottom cooling tubes) are non-cooling tubes. For example, the first set of cooling tubes 812 may be insulated such that no cooling of the charge air occurs in these tubes. In another example, the second set of cooling tubes 812 may not include cooling fins or other cooling means such that charge air flowing through the non-cooling tubes is not cooled.

The slots corresponding to the second set of cooling tubes 814 each have a different length from one another. For example, the slots corresponding to the second set of cooling tubes may progressively increase in length from the first length at a first slot at a first end of the barrel valve to a second length at a second slot closer to a second end of the barrel valve. As shown in FIGS. 8-9, a slot closest to the top 808 (e.g., first end) of the barrel valve 308 and corresponding to the sixth cooling tube 222 may also have the first length. A slot closer to the base 810 (e.g., second end) of the barrel valve 308 and corresponding to the third cooling tube 216 may have a second length, the second length longer than the first length. As such, the slots corresponding to the second set of cooling tubes progressively increase in length from the first length at a slot at the top 808 of the barrel valve 308 to the second length at a slot closer to the base 810 of the barrel valve 308. In an alternate embodiment, the slot lengths may be reversed such that the slots corresponding to the second set of cooling tubes progressively increase in length from the first length at a slot at the base 810 of the barrel valve 308 to a second length at a slot closer to the top 808 of the barrel valve 308.

Further, the slots corresponding to the second set of cooling tubes 814 may align with one another at a first end of the slots. As such, when the topmost slot is aligned with the sixth cooling tube 222, all the slots corresponding to the second set of cooling tubes 814 are aligned with their corresponding cooling tubes. However, in this example, the first slot 912 and the second slot 914 are not aligned with their respective cooling tubes. Thus, charge air may flow through only the second set of cooling tubes 814 and not through the first set of cooling tubes 812. The controller may rotate the barrel valve 308 into a plurality of positions which allow any number between zero and four (e.g., all) of the cooling tubes in the second set of cooling tubes to be aligned with their respective slots, thereby flowing charge air through the uncovered tubes. The cooling tubes of the second set of cooling tubes provide cooling to the charge air passing through the uncovered tubes.

Additionally, the first slot 912 and the second slot 914 are oriented with respect to the other slots such that when any or all of the cooling tubes in the second set of cooling tubes 814 are flowing charge air (e.g., slots are aligned with the corresponding tubes), the first set of cooling tubes are blocked and do not flow charge air. The first slot 912 and second slot 914 may only be aligned with the first set of cooling tubes 812 when all of the cooling tubes of the second set of cooling tubes 814 are blocked by the wall of the barrel valve 308. In one example, the controller may actuate the barrel valve 308 into this position when less charge air cooling is required.

In this way, an air flow regulating system for a charge air cooler may comprise an air flow regulating element positioned in a tank of the charge air cooler, the air flow regulating element including a cylindrical barrel valve rotatable about a rotational axis to adjust air flow through cooling tubes within the charge air cooler. The tank may be an inlet tank, wherein the barrel valve has an outer diameter which spans across the inlet tank from a wall of the charge air cooler to a first end of the cooling tubes, and wherein the cooling tubes include a first set of cooling tubes and a second set of cooling tubes. Further, the barrel valve may be a hollow cylinder including a series of slots of different lengths in an outer wall and along a height of the barrel valve and wherein each slot of the series of slots aligns with one of the cooling tubes.

In a first example, the height of the barrel valve extends along a height of the second set of cooling tubes and the barrel valve covers the second set of cooling tubes at a first end of the cooling tubes. A base of the barrel valve may be positioned between the first set of cooling tubes and the second set of cooling tubes. Additionally, a length of each slot increases from a top of the barrel valve to the base.

In a second example, the height of the barrel valve extends along a first height of the first set of cooling tubes and a second height of the second set of cooling tubes and the barrel valve covers the first set of cooling tubes and the second set of cooling tubes at the first end of the cooling tubes. Slots corresponding to the first set of cooling tubes have a first length and slots corresponding to the second set of cooling tubes progressively increase in length from the first length at a first slot at a top of the barrel valve to a second length at a second slot closer to a base of the barrel valve. Further, the slots corresponding to the first set of cooling tubes do not line up with any of the slots corresponding to the second set of cooling tubes and wherein the first set of cooling tubes are insulated non-cooling tubes.

Additionally, the rotational axis of the barrel valve is perpendicular to the cooling tubes, the barrel valve is rotated about the rotational axis by a rotary actuator, and the rotary actuator is coupled to a controller configured to adjust a position of the barrel valve based on one or more of a mass air flow rate and a temperature at an outlet of the charge air cooler.

FIG. 4 shows a schematic 400 of a third embodiment of an air flow regulating element 206 in a CAC 80. FIG. 4 is a cross-section of the CAC 80 and contains similar parts as described above with regard to FIG. 2. Further, FIG. 4 includes the axis system showing the vertical axis 234 and the horizontal axis 236. As shown in FIG. 4, the air flow regulating element 206 includes a sliding element 408 rotatable about a spool 406. The sliding element 408 and the spool 406 are positioned in the inlet tank 224 of the CAC 80. As such, the sliding element 408 may cover a number between zero and all of the cooling tubes in the second set of cooling tubes. Specifically, the sliding element 408 may cover the second set of cooling tubes at the first end, or inlet, of the cooling tubes. Thus, when the sliding element 408 covers one or more cooling tubes in the second set of cooling tubes, no air flow may enter and travel through the covered cooling tubes. In an alternate embodiment, the sliding element 408 and the spool 406 may be positioned in the outlet tank 226 of the CAC 80. In this embodiment, the sliding element 408 may cover the second end, or outlet, of one or more of the cooling tubes in the second set of cooling tubes. As such, no air flow may exit the one or more covered cooling tubes and exit the CAC 80.

As discussed above, charge air entering the CAC 80 may always flow through the first set of cooling tubes. As shown in FIG. 2, the first set of cooling tubes includes the first cooling tube 212 and the second cooling tube 214. The second set of cooling tubes includes the third cooling tube 216, the fourth cooling tube 218, the fifth cooling tube 220, and the sixth cooling tube 222. In alternate embodiments, the first set of cooling tubes and the second set of cooling tubes may include more or less than two and four cooling tubes, respectively. Further, the sliding element 408 may cover, or span, more or less than four cooling tubes. For example, the first set of cooling tubes may include one cooling tube and the second set of cooling tubes may include five cooling tubes. In another embodiment, the first set of cooling tubes may include three cooling tubes and the second set of cooling tubes may include three cooling tubes.

The sliding element 408 may be wound about the spool 406. Rotating the spool may move and/or slide the sliding element 408 in a vertical direction, with reference to the vertical axis 234. In one example, rotating the spool 406 in a first direction may slide the sliding element 408 upward, in the vertical direction, and toward the spool 406. Rotating the spool in a second direction, opposite the first direction, may then slide the sliding element 408 downward, in the vertical direction, and away from the spool 406. In one example, as shown at arrow 410, the first direction may be counterclockwise.

Figure 10:
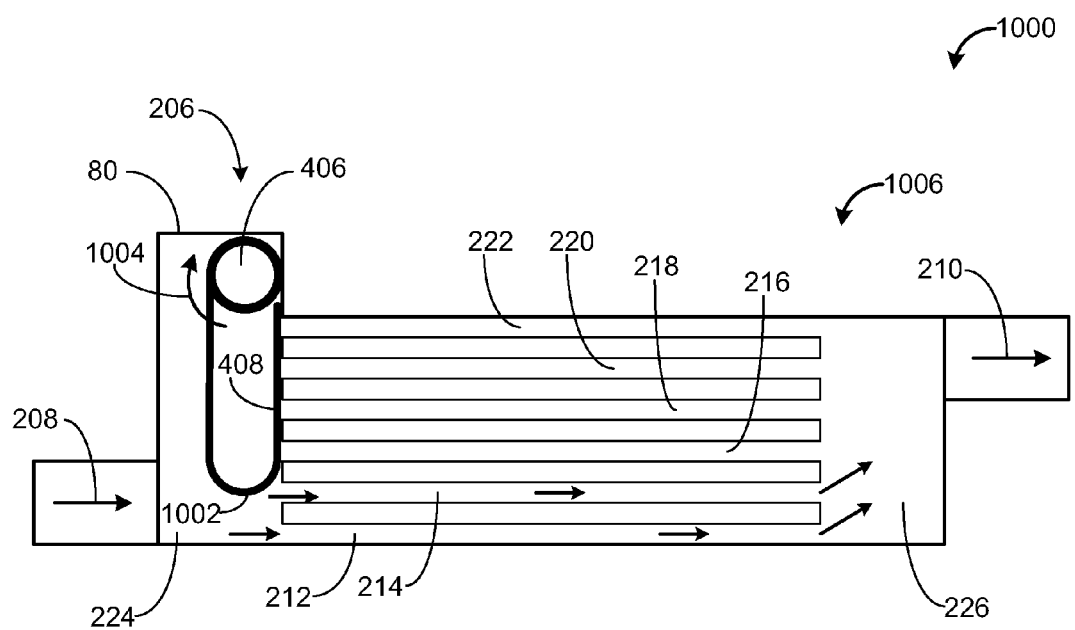
FIG. 10 is a schematic of a second view of a third embodiment of an air flow regulating element in a charge air cooler
Figure 10:
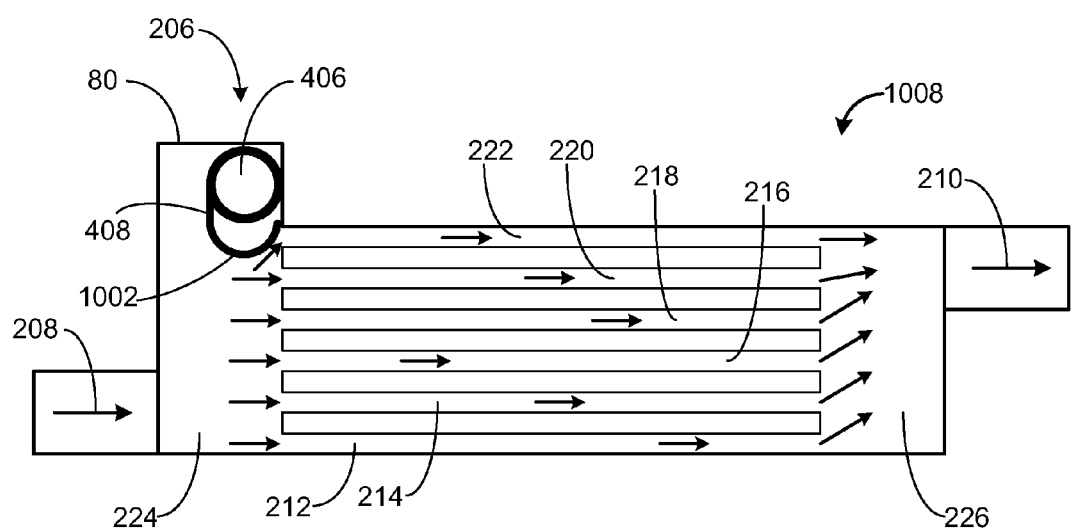
Figure 10:
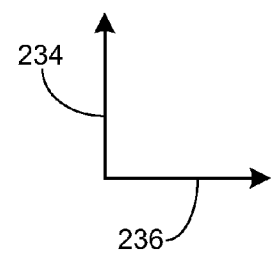

FIG. 10 shows an alternate embodiment in which the first direction may be clockwise. As shown in FIG. 10, the sliding element 408 further includes a looped end 1002. In this embodiment, the sliding element 408 slides along a surface, or area within the inlet tank 224, opposite the first end of the cooling tubes. At the first end, or inlet opening, of the cooling tubes, the sliding element 408 may peel away to uncover the cooling tubes or be laid down to cover the cooling tubes. For example, as the spool 406 rotates in a clockwise direction, as shown at arrow 1004, the sliding element 408 winds around the spool and gradually peels away from the first end of the tubes to uncover more of the cooling tubes of the second set of cooling tubes. This embodiment may reduce wear and/or air leakage of the cooling tubes.

In a first position, as shown at 402 and 1006, the sliding element 408 may cover all the cooling tubes in the second set of cooling tubes. As shown in FIG. 4 and FIG. 10, the sliding element covers the four cooling tubes in the second set of cooling tubes. In this position, no air flow may enter the first end of the cooling tubes in the second set of cooling tubes. Thus, all of the charge air entering the CAC 80 at the inlet tank 224 may pass through the first set of cooling tubes. In a second position, as shown at 404 and 1008, the sliding element 408 may cover none of the cooling tubes in the second set of cooling tubes. As such, air flow may enter and travel through all the cooling tubes in the first set of cooling tubes and the second set of cooling tubes.

Starting in the first position, rotating the spool 406 in the first direction, shown by arrow 410 in FIG. 4 and arrow 1004 in FIG. 10, may progressively uncover an increasing amount of cooling tubes of the second set of cooling tubes, thereby allowing air flow through the uncovered tubes. Starting from the second position, rotating the spool 406 is the second direction may progressively cover an increasing amount of cooling tubes of the second set of cooling tubes, thereby blocking air flow through the covered tubes.

In one example, a controller (such as controller 12 in FIG. 1) may actuate the spool 406 to rotate in either the first direction or the second direction to uncover or cover (e.g., block), respectively, more of the cooling tubes in the second set of cooling tubes. In one example, the controller may actuate the spool 406 to rotate such that the sliding element 408 covers only one cooling tube in the second set of cooling tubes, thereby allowing air flow through the third cooling tube 216, the fourth cooling tube 218, and the fifth cooling tube 220. In another example, the controller may actuate the spool 406 to rotate such that the sliding element 408 covers three of the cooling tubes (e.g., the fourth cooling tube 218, the fifth cooling tube 220, and the sixth cooling tube 222), while allowing air flow through one cooling tube (e.g., the third cooling tube 216) of the second set of cooling tubes. The controller may actuate the spool 406 to rotate and move the sliding element 408 into different positions in response to various engine operating conditions, including a mass air flow rate and a temperature of the charge air exiting the CAC 80. As such, the controller may adjust the position of the sliding element 408 to maintain a minimum air flow velocity through the cooling tubes of the CAC 80 and control an efficiency of the CAC 80. Methods for adjusting the air flow regulating element 206 based on engine operating conditions are discussed further below with regard to FIG. 7.

FIG. 5 shows a schematic 500 of a fourth embodiment of an air flow regulating element 206 in a CAC 80. FIG. 5 is a cross-section of the CAC 80 and contains similar parts as described above with regard to FIG. 2. Further, FIG. 5 includes the axis system showing the vertical axis 234 and the horizontal axis 236. As shown in FIG. 5, the air flow regulating element 206 includes a flapper valve 506 positioned horizontally, with respect to the horizontal axis 236, within the inlet tank 224 of the CAC 80. The flapper valve 506 may be a passive valve including a spring to hold the flapper valve 506 in a closed position when an air flow pressure in the inlet tank 224 is below a threshold. Additionally, the flapper valve 506 may be inertially balanced about its axis of rotation such that acceleration forces that may occur in a moving vehicle do not cause the valve to open and/or close.

In the closed position, as shown at 502, ends of the flapper valve 506 are positioned adjacent to and contact two projections. Specifically, a first end of the flapper valve 506 contacts a bottom side of a first projection 508 and a second end of the flapper valve 506 contacts a top side of a second projection 510 when the flapper valve 506 is in the closed position. The ends of the flapper valve 506 may be positioned against the corresponding projections such that no air may pass from an upstream side to a downstream side of the flapper valve 506. The first projection 508 is coupled to a wall of the CAC 80 and the second projection 510 is coupled to an internal wall of the CAC 80, between adjacent cooling tubes.

When the flapper valve 506 is in the closed position (shown at 502), charge air may flow through the first set of cooling tubes and not through the second set of cooling tubes. As shown in FIG. 5, the first set of cooling tubes includes the first cooling tube 212, the second cooling tube 214, and the third cooling tube 216. The second set of cooling tubes includes the fourth cooling tube 218, the fifth cooling tube 220, and the sixth cooling tube 222. The flapper valve 506, the first projection 508, and the second projection 510 are positioned in the inlet tank 224 at a level, with respect to the vertical axis 234, between the first set of cooling tubes and the second set of cooling tubes. As such, charge air may only enter the first set of cooling tubes, at the first end of the cooling tubes, when the flapper valve 506 is in the closed position. The closed flapper valve 506 blocks charge air from entering the first end of the second set of cooling tubes. As a result, an air flow rate (e.g., velocity) of the charge air flowing through the first set of cooling tubes may be larger when the flapper valve 506 is closed than if it were open under the same mass air flow conditions.

In alternate embodiments, the first set of cooling tubes and the second set of cooling tubes may include more or less than three cooling tubes. Further, a number of cooling tubes in the first set of cooling tubes may not equal a number of cooling tubes in the second set of cooling tubes. For example, the first set of cooling tubes may include two cooling tubes and the second set of cooling tubes may include six cooling tubes. In another embodiment, the first set of cooling tubes may include four cooling tubes and the second set of cooling tubes may include three cooling tubes.

When the air flow pressure in the inlet tank 224 increases above the threshold, the flapper valve 506 may open. The threshold may be based on a stiffness or spring constant, along with a spring preload, of the spring in the flapper valve 506. As such, as the stiffness or preload of the spring increases, the threshold at which the flapper valve 506 opens may increase. The flapper valve 506 opens and closes in response to air flow pressure. Thus, the air flow pressure above the threshold pushes against the upstream side of the flapper valve 506, thereby opening the flapper valve 506.

Specifically, in the open position, as shown at 504, ends of the flapper valve 506 move away from the two projections. The increased air flow pressure pushes against the upstream side of the flapper valve 506 and moves the second end upward and away from the second projection. In the open position, the ends of the flapper valve 506 no longer contact the projections, thereby allowing air to flow past the valve to the first ends of the second set of cooling tubes. Thus, in the open position, charge air may flow through both the first set of cooling tubes and the second set of cooling tubes. The flapper valve 506 may move from the closed position to the open position and/or from the open position to the closed position by rotating around a valve pivot point 512.

FIG. 6 shows a schematic 600 of a fifth embodiment of an air flow regulating element 206 in a CAC 80. FIG. 6 is a cross-section of the CAC 80 and contains similar parts as described above with regard to FIG. 2. Further, FIG. 6 includes the axis system showing the vertical axis 234 and the horizontal axis 236. As shown in FIG. 6, the air flow regulating element 206 includes a flapper valve 606 positioned vertically, with respect to the vertical axis 234, within the outlet tank 226 of the CAC 80. The flapper valve 606 may be a passive valve including a spring to hold the flapper valve 606 in a closed position when an air flow pressure in the second set of cooling tubes is below a threshold. In the closed position, as shown at 602, an arm 612 of the flapper valve 606 covers the second end (e.g., outlet end) of the second set of cooling tubes. Specifically, the arm 612 of the flapper valve 606 is positioned against the second end of the second set of cooling tubes such that no air may pass from inside the second set of cooling tubes to the outlet tank 226.

When the flapper valve 606 is in the closed position (shown at 602), charge air may flow through the first set of cooling tubes. Charge air may enter the second set of cooling tubes; however, the charge air may not exit the second set of cooling tubes and enter the outlet tank 226. As such, charge air may not pass through and past the second end of the second set of cooling tubes when the flapper valve 606 is closed. As shown in FIG. 6, the first set of cooling tubes includes the first cooling tube 212, the second cooling tube 214, and the third cooling tube 216. The second set of cooling tubes includes the fourth cooling tube 218, the fifth cooling tube 220, and the sixth cooling tube 222. The flapper valve 606 is positioned in the outlet tank 226, vertically along the second set of cooling tubes. A flapper valve pivot point 608 and counter balance 610 are positioned vertically above, with respect to the vertical axis 234, the second set of cooling tubes. In some examples, as shown in FIG. 6, the pivot point 608 and counter balance 610 are positioned in upper cavity in the outlet tank 226. The upper cavity may be large enough to contain the counter balance 610 in both an open and closed position of the flapper valve 606.

In this way, charge air may only exit the first set of cooling tubes, at the second end of the cooling tubes, when the flapper valve 606 is in the closed position. The closed flapper valve 606 blocks charge air from exiting the second end of the second set of cooling tubes. As a result, an air flow rate (e.g., velocity) of the charge air flowing through the first set of cooling tubes may be larger when the flapper valve 606 is closed than if it were open under the same mass air flow conditions.

In alternate embodiments, the first set of cooling tubes and the second set of cooling tubes may include more or less than three cooling tubes. Further, a number of cooling tubes in the first set of cooling tubes may not equal a number of cooling tubes in the second set of cooling tubes. For example, the first set of cooling tubes may include one cooling tube and the second set of cooling tubes may include five cooling tubes. In another embodiment, the first set of cooling tubes may include four cooling tubes and the second set of cooling tubes may include two cooling tubes.

When the air flow pressure passing through the second set of cooling tubes increases above the threshold, the flapper valve 606 may open. The threshold may be based on a stiffness or spring constant, along with preload, of the spring in the flapper valve 606. As such, as the stiffness or preload of the spring increases, the threshold at which the flapper valve 606 opens may increase. The flapper valve 606 opens and closes in response to air flow pressure. Thus, the air flow pressure above the threshold pushes against the upstream side of the arm 612 of the flapper valve 606, thereby opening the flapper valve 606.

Specifically, in the open position, as shown at 604, the arm 612 moves away from the second end of the second set of cooling tubes. The increased air flow pressure in the second set of cooling tubes pushes against the upstream side of the arm 612 and moves the arm 612 away from the second set of cooling tubes. In the open position, the arm 612 of the flapper valve 606 no longer contacts the second end of the second set of cooling tubes, thereby allowing air to flow out the second set of cooling tubes, past the valve, and into the outlet tank 226. Thus, in the open position, charge air may flow through both the first set of cooling tubes and the second set of cooling tubes. As discussed above, the flapper valve 606 may move from the closed position to the open position and/or from the open position to the closed position by rotating around the pivot point 608, based on the air flow pressure.

In this way, an air flow regulating system for a charge air cooler comprises an air flow regulating element positioned in a tank of the charge air cooler, the air flow regulating element adjustable to regulate air flow through a plurality of cooling tubes in the charge air cooler. More specifically, the air flow regulating element is adjustable to alter a number of cooling tubes in the charger air cooler through which air flows. The cooling tubes may include a first set of cooling tubes wherein air flow through the first set of cooling tubes is always flowing and a second set of cooling tubes wherein air flow through the second set of cooling tubes is regulated with the air flow regulating element. A position of the air flow regulating element may be adjusted based on one or more of a mass air flow rate and a temperature at an outlet of the charge air cooler.

In one example, the air flow regulating element includes a valve adjustable between an open position and a closed position, the open position allowing air flow through the first set of cooling tubes and the second set of cooling tubes and the closed position allowing air flow through only the first set of cooling tubes. Further, the valve may be positioned in an inlet tank of the charge air cooler and wherein the valve is adjusted with an actuator. In one example, the valve is a flapper valve positioned within an inlet tank of the charge air cooler. In this example, the flapper valve may be passively adjusted from the closed position to the open position when an air flow pressure in the inlet tank is greater than a threshold. In another example, the valve is a flapper valve positioned within an outlet tank of the charge air cooler. In this example, the flapper valve may be passively adjusted from the closed position to the open position when an air flow pressure in the second set of cooling tubes is greater than a threshold.

In another example, the air flow regulating element includes a barrel valve positioned in an inlet tank of the charge air cooler. The barrel valve may cover the second set of cooling tubes. Further, the barrel valve is rotatable around a rotational axis to progressively uncover cooling tubes in the second set of cooling tubes to allow air flow through the uncovered tubes. In yet another example, the air flow regulating element includes a sliding element rotatable about a spool, the sliding element adjustable by rotating in a first direction around the spool to progressively uncover an increasing amount of cooling tubes of the second set of cooling tubes to allow air flow through the uncovered cooling tubes.

In some embodiments, an external surface area or fin density of the CAC may be adjusted based on an orientation of the first set of cooling tubes and the second set of cooling tubes within the CAC. For example, the external surface area or a number of external cooling fins may be fewer, or less concentrated, on a portion of the CAC that is always flowing charge air (e.g., portion with the first set of cooling tubes) compared to the portion of the CAC that only sometimes flow charge air, based on the position of the air flow regulating element (e.g., the portion with the second set of cooling tubes).

Turning now to FIG. 7, a method 700 is shown for adjusting air flow through the CAC. As described above, the CAC may include an air flow regulating element for adjusting air flow through the cooling tubes in the CAC. In one example, the method 700 is executable by the controller 12 shown in FIG. 1. As such, the controller may adjust a position of the air flow regulating element to increase or decrease a number of active (e.g., open and not blocked) cooling tubes based on engine operating conditions. In this way, adjusting the position of the air flow regulating element may adjust an air flow rate (e.g., velocity) through the CAC.

The method begins at 702 by estimating and/or measuring engine operating conditions. Engine operating conditions may include engine speed and load, boost pressure, pedal position, mass air flow, MAP, EGR flow, engine temperature, torque demand, charge air cooler conditions (inlet temperature, outlet temperature, inlet pressure, outlet pressure, flow rate through the CAC, etc.), etc. At 704, the method includes determining if the mass air flow rate is less than a first threshold rate or velocity. The mass air flow rate may be directly related to the velocity, or air flow rate, of the charge air entering the CAC. In one example, the first threshold velocity may be a minimum threshold. When the mass air flow rate is less than the minimum threshold, condensate may accumulate inside the cooling tubes of the CAC. As such, the first threshold velocity may be a minimum threshold below which condensate may accumulate in the CAC cooling tubes. Additionally, the method at 704 includes determining if the CAC outlet temperature (e.g., temperature of the charge air exiting the CAC) is less than a first threshold temperature. In one example, the first threshold temperature may be a minimum threshold temperature. As such, a CAC outlet temperature less than the first threshold temperature may result in increased condensate formation in the CAC. In alternate examples, adjusting the air flow regulating element may be further based on CAC efficiency and/or an amount of condensate formed in the CAC. As such, the air flow regulating element may be adjusted to decrease CAC efficiency and condensate formation.

Returning to 704, if one or more of the conditions are met, the method continues on to 706 to adjust the air flow regulating element to increase the air flow velocity through the cooling tubes of the CAC. Adjusting the air flow regulating element to increase the air flow velocity through the CAC cooling tubes may include decreasing the number of cooling tubes in the CAC flowing charge air. For example, if the air flow regulating element is a two-position valve, as shown in FIG. 2, the controller may close the valve 228 to cut off air flow through the second set of cooling tubes. As such, charge air may only flow through the first set of cooling tubes. In addition to increasing the air flow rate through the CAC cooling tubes, closing the valve may also increase the temperature of the charge air exiting the CAC, thereby reducing condensate formation. In another example, if the air flow regulating element is a multi-position element, such as the barrel valve 308 shown in FIG. 3, the controller may rotate the barrel valve 308 in a first direction to block more cooling tubes of the second set of cooling tubes. Specifically, a controller may actuate the rotary actuator to rotate the barrel valve 308 in the first direction, thereby decreasing the number of cooling tubes in the CAC flowing charge air. The number of cooling tubes which the barrel valve, or other multi-position element (such as the sliding element shown in FIG. 4), covers or blocks may be based on the mass air flow or velocity of charge air entering the CAC, the CAC outlet temperature, and/or an amount of condensate accumulated in the CAC. Specifically, the controller may adjust the air flow regulating element to block or deactivate more cooling tubes as the velocity of the charge air entering the CAC decreases, the mass air flow rate decreases, the CAC outlet temperature decreases, and or the amount of condensate accumulated in the CAC increases.

In yet another example, if the barrel valve 308 is a valve as shown in FIGS. 8-9, which covers both the first set of cooling tubes and the second set of cooling tubes, the controller may adjust the position of the barrel valve to block the second set of cooling tubes and allow air flow through only the first set of cooling tubes. In this example, the first set of cooling tubes may be insulated non-cooling tubes, thereby reducing cooling to the charge air flowing through these tubes. As a result, the temperature at the CAC outlet may increase.

Alternatively, if the charge air velocity entering the CAC is not less than the first threshold velocity and the CAC outlet temperature is not less than the first threshold temperature, the method continues on to 708. At 708, the method includes determining if the mass air flow rate is greater than a second threshold velocity and/or if the CAC outlet temperature is greater than a second threshold temperature. The second threshold velocity and the second threshold temperature are greater than the first threshold velocity and the second threshold temperature, respectively. Further the second threshold velocity and the second threshold temperature may be upper or maximum thresholds. For example, the second threshold velocity may be based on an air flow rate which may cause a pressure drop across the CAC over a threshold if the second set of cooling tubes were inactive. In another example, the second threshold temperature may be based on a charge air temperature above which engine knock may occur.

Returning to 708, if one or more of the conditions are met, the method continues on to 710 to adjust the air flow regulating element to decrease the air flow velocity through the CAC cooling tubes. Adjusting the air flow regulating element to decrease the air flow velocity through the CAC cooling tubes may include increasing the number of cooling tubes in the CAC flowing charge air. For example, if the air flow regulating element is a two-position valve, as shown in FIG. 2, the controller may open the valve 228 to allow air flow through the second set of cooling tubes. As such, charge air may flow through both the first set of cooling tubes and the second set of cooling tubes. In addition to decreasing the air flow rate through the cooling tubes of the CAC, opening the valve may also decrease the temperature of the charge air exiting the CAC, thereby reducing a risk for engine knock. In another example, if the air flow regulating element is a multi-position element, such as the barrel valve 308 shown in FIG. 3, the controller may rotate the barrel valve 308 in a second direction, the second direction opposite the first direction, to uncover more cooling tubes of the second set of cooling tubes. Specifically, the controller may actuate the rotary actuator to rotate the barrel valve 308 in the second direction, thereby increasing the number of cooling tubes in the CAC flowing charge air. The number of cooling tubes which the barrel valve, or other multi-position element (such as the sliding element shown in FIG. 4), covers may be based on the mass air flow or velocity of charge air entering the CAC, the CAC outlet temperature, and/or an amount of condensate accumulated in the CAC. Specifically, the controller may adjust the air flow regulating element to activate (e.g., uncover) more cooling tubes as the velocity of the charge air entering the CAC increases, the mass air flow rate increases, and/or the CAC outlet temperature increases.

Returning to 708, if neither of the conditions at 708 are met, the method continues on to 712 to maintain the position of the air flow regulating element, thereby maintaining the air flow velocity through the CAC cooling tubes. As shown in method 700, the controller may adjust the position of the air flow regulating element to maintain an air flow velocity through the CAC cooling tubes within a target air flow range. In one example, the target air flow range may be between the first threshold velocity and the second threshold velocity. Further, the controller may adjust the position of the air flow regulating element to maintain a CAC outlet temperature within a target temperature range. For example, the target temperature range may be between the first threshold temperature and the second threshold temperature.

In this way, a position of an air flow regulating element within a charge air cooler may be adjusted based on a mass air flow rate, or velocity of charge air entering the charge air cooler. Additionally, the adjusting may be based on a temperature of the charge air exiting the charge air cooler. In one example, adjusting the position of the air flow regulating element includes adjusting the air flow regulating element to increase an air flow velocity through the cooling tubes of the charge air cooler responsive to one or more of the mass air flow rate being less than a first threshold velocity and the temperature of the charge air exiting the charge air cooler being less than a first threshold temperature. Adjusting the air flow regulating element to increase the air flow velocity through the cooling tubes of the charge air cooler may include decreasing a number of cooling tubes in the charge air cooler flowing charge air. In another example, adjusting the position of the air flow regulating element includes adjusting the air flow regulating element to decrease an air flow velocity through the cooling tubes of the charge air cooler responsive to one or more of the mass air flow rate being greater than a second threshold velocity, the second threshold velocity greater than the first threshold velocity, and the temperature of the charge air exiting the charge air cooler being greater than a second threshold temperature, the second threshold temperature greater than the first threshold temperature. Adjusting the air flow regulating element to decrease the air flow velocity through the cooling tubes of the charge air cooler includes increasing a number of cooling tubes in the charge air cooler flowing charge air.

In one embodiment, the air flow regulating element may include the barrel valve shown in FIG. 3. Specifically, the barrel valve may be positioned in an inlet tank of the charge air cooler, downstream of a first set of cooling tubes through which air flow is always possible and adjacent to a second set of cooling tubes through which air flow is not always possible. In this embodiment, a controller may adjust a position of the cylindrical barrel valve positioned within the charge air cooler to adjust an air flow velocity through the cooling tubes of the charge air cooler based on a mass air flow rate, or velocity of charge air entering the charge air cooler. As discussed above, the velocity of the charge air entering the charge air cooler is based on a mass air flow rate. Further, the adjusting may also be based on a temperature of the charge air exiting the charge air cooler. Adjusting the position of the barrel valve includes rotating the barrel valve around a rotational axis with a rotary actuator coupled to the barrel valve. In one example, the controller may rotate the barrel valve in a first direction to increase the air flow velocity through the cooling tubes of the charge air cooler responsive to one or more of the mass air flow rate being less than a first threshold velocity and the temperature of the charge air exiting the charge air cooler being less than a first threshold temperature. In this example, increasing the air flow velocity through the cooling tubes of the charge air cooler includes decreasing a number of cooling tubes in the charge air cooler flowing charge air. In another example, the controller may rotate the barrel valve in a second direction, opposite the first direction, to decrease the air flow velocity through the cooling tubes of the charge air cooler responsive to one or more of the mass air flow rate being greater than a second threshold velocity, the second threshold velocity greater than the first threshold velocity, and the temperature of the charge air exiting the charge air cooler being greater than a second threshold temperature, the second threshold temperature greater than the first threshold temperature. In this example, decreasing the air flow velocity through the cooling tubes of the charge air cooler includes increasing a number of cooling tubes in the charge air cooler flowing charge air.

As discussed above, by increasing an air flow velocity through the cooling tubes of the CAC, condensation that forms on the walls may be stripped off and entrained in the air flow rather than accumulating in the CAC. In one example, an air flow regulating element may be adjusted to increase or decrease the air flow velocity through the cooling tubes of the CAC. A position of the air flow regulating element may be based on a mass air flow rate, a velocity of the charge air entering the CAC, and/or a temperature of the charge air exiting the CAC. The air flow regulating element may increase or decrease the air flow velocity through the cooling tubes of the CAC by respectively decreasing or increasing the number of CAC cooling tubes available for air flow. In this way, maintaining air flow velocity through the cooling tubes of the CAC within a target range, the accumulation of condensate may be reduced, thereby reducing a likelihood for engine misfire.

As one embodiment, a charge air cooler for use with an engine comprises a plurality of cooling tubes configurable to receive charge air from a first end of the plurality of cooling tubes and to output cooled charge air from a second end of the plurality of cooling tubes, the plurality of cooling tubes including a first set of cooling tubes and a second set of cooling tubes. The charge air cooler further comprises an air flow regulating element including a cylindrical barrel valve positioned in an inlet tank the charge air cooler, the barrel valve rotatable about a rotational axis to progressively adjust charge air flow through the second set of cooling tubes. The barrel valve has an outer diameter which spans across the inlet tank from a wall of the charge air cooler to the first end of the plurality of cooling tubes. Further, the barrel valve is a hollow cylinder including a series of slots of different circumferential lengths in an outer wall and along a height of the barrel valve, each slot of the series of slots aligning with one cooling tube of the plurality of cooling tubes.

In one example, the height of the barrel valve extends along a height of the second set of cooling tubes and the barrel valve covers the second set of cooling tubes at the first end of the cooling tubes. A base of the barrel valve is positioned between the first set of cooling tubes and the second set of cooling tubes and a length of each slot increases from a first end of the barrel valve to a second end of the barrel valve.

In another example the height of the barrel valve extends along a first height of the first set of cooling tubes and a second height of the second set of cooling tubes and the barrel valve covers the first set of cooling tubes and the second set of cooling tubes at the first end of the cooling tubes. Slots corresponding to the first set of cooling tubes have a first length and slots corresponding to the second set of cooling tubes progressively increase in length from the first length at a first slot at a first end of the barrel valve to a second length at a second slot closer to a second end of the barrel valve. Further, the slots corresponding to the first set of cooling tubes do not line up with any of the slots corresponding to the second set of cooling tubes and the first set of cooling tubes are insulated non-cooling tubes.

Additionally, the rotational axis is perpendicular to the cooling tubes and the barrel valve is rotated about the rotational axis by a rotary actuator. The rotary actuator is coupled to a controller configured to adjust a position of the barrel valve based on one or more of a mass air flow rate and a temperature at an outlet of the charge air cooler.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An air flow regulating system for a charge air cooler (CAC), comprising:
an air flow regulating element including a cylindrical barrel valve positioned in a tank of the CAC, the barrel valve adjustable to alter a number of cooling tubes in the CAC through which air flows, an outer wall of the barrel valve including a series of staggered slots of different circumferential lengths, each slot aligning with one cooling tube of the cooling tubes.

2. The air flow regulating system of claim 1, wherein the cooling tubes include a first set of cooling tubes wherein air flow through the first set of cooling tubes is always flowing and a second set of cooling tubes wherein air flow through the second set of cooling tubes is regulated with the air flow regulating element and wherein a position of the air flow regulating element is adjusted based on one or more of a mass air flow rate and a temperature at an outlet of the CAC.

3. The air flow regulating system of claim 2, wherein the barrel valve is positioned in an inlet tank of the CAC and wherein the barrel valve covers the second set of cooling tubes, the barrel valve rotatable around a rotational axis to progressively uncover cooling tubes in the second set of cooling tubes to allow air flow through the uncovered cooling tubes.

4. The air flow regulating system of claim 2, wherein the air flow regulating element includes a valve adjustable between a first position and a second position, the first allowing air flow through the first set of cooling tubes and the second set of cooling tubes and the second position allowing air flow through only the first set of cooling tubes, wherein the valve is positioned in an inlet tank of the CAC, wherein the valve is adjusted with an actuator, and wherein the barrel valve has an outer diameter which spans across the inlet tank from a wall of the CAC to a first end of the second set of cooling tubes.

5. An engine method, comprising:
adjusting a position of a cylindrical barrel valve positioned within a charge air cooler (CAC), downstream of a first set of cooling tubes and adjacent to a second set of cooling tubes of the CAC, to progressively cover and uncover an increasing amount of tubes in the second set of cooling tubes via a series of staggered slots in an outer wall of the barrel valve to adjust an air flow velocity through the first and second sets of cooling tubes based on an operating condition.

6. The method of claim 5, wherein the operating condition includes a mass air flow rate and wherein the barrel valve is positioned in an inlet tank of the CAC, wherein air flow is always possible through the first set of cooling tubes, and wherein air flow is not always possible through the second set of cooling tubes.

7. The method of claim 6, wherein the adjusting is further based on a temperature of charge air exiting the CAC and wherein adjusting the position of the barrel valve includes rotating the barrel valve around a rotational axis with a rotary actuator coupled to the barrel valve to variably cover and uncover different cooling tubes of the second set of cooling tubes of the CAC in different discrete combinations of cooling tubes.

8. The method of claim 7, further comprising rotating the barrel valve in a first direction to increase the air flow velocity through the first and second sets of cooling tubes of the CAC responsive to one or more of the mass air flow rate being less than a first threshold velocity and the temperature of the charge air exiting the CAC being less than a first threshold temperature and wherein increasing the air flow velocity through the first and second sets of cooling tubes of the CAC includes decreasing a number of cooling tubes in the CAC flowing charge air.

9. The method of claim 8, further comprising rotating the barrel valve in a second direction, opposite the first direction, to decrease the air flow velocity through the first and second sets of cooling tubes of the CAC responsive to one or more of the mass air flow rate being greater than a second threshold velocity, the second threshold velocity greater than the first threshold velocity, and the temperature of the charge air exiting the CAC being greater than a second threshold temperature, the second threshold temperature greater than the first threshold temperature and wherein decreasing the air flow velocity through the first and second sets of cooling tubes of the CAC includes increasing the number of cooling tubes in the CAC flowing charge air.

10. A charge air cooler for use with an engine, comprising:
a plurality of cooling tubes configurable to receive charge air from a first end of the plurality of cooling tubes and to output cooled charge air from a second end of the plurality of cooling tubes, the plurality of cooling tubes including a first set of cooling tubes and a second set of cooling tubes; and
an air flow regulating element including a cylindrical barrel valve positioned in an inlet tank of the charge air cooler, where the barrel valve has an outer diameter which spans across the inlet tank from a wall of the charge air cooler to the first end of the plurality of cooling tubes, the barrel valve rotatable about a rotational axis to progressively adjust charge air flow through the second set of cooling tubes.

11. The charge air cooler of claim 10, wherein the barrel valve is a hollow cylinder including a series of slots of different circumferential lengths in an outer wall and along a height of the barrel valve, each slot of the series of slots aligning with one cooling tube of the plurality of cooling tubes.

12. The charge air cooler of claim 11, wherein the height of the barrel valve extends along a height of the second set of cooling tubes and wherein the barrel valve covers the second set of cooling tubes at the first end of the cooling tubes.

13. The charge air cooler of claim 12, wherein a base of the barrel valve is positioned between the first set of cooling tubes and the second set of cooling tubes and wherein a length of each slot increases from a first end of the barrel valve to a second end of the barrel valve.

14. The charge air cooler of claim 11, wherein the height of the barrel valve extends along a first height of the first set of cooling tubes and a second height of the second set of cooling tubes and wherein the barrel valve covers the first set of cooling tubes and the second set of cooling tubes at the first end of the cooling tubes.

15. The charge air cooler of claim 14, wherein slots corresponding to the first set of cooling tubes have a first length and slots corresponding to the second set of cooling tubes progressively increase in length from the first length at a first slot at a first end of the barrel valve to a second length at a second slot closer to a second end of the barrel valve.

16. The charge air cooler of claim 15, wherein the slots corresponding to the first set of cooling tubes do not line up with any of the slots corresponding to the second set of cooling tubes and wherein the first set of cooling tubes are insulated non-cooling tubes.

17. The charge air cooler of claim 10, wherein the rotational axis is perpendicular to the cooling tubes, wherein the barrel valve is rotated about the rotational axis by a rotary actuator, and wherein the rotary actuator is coupled to a controller configured to adjust the barrel valve into a plurality of positions between zero and all of the cooling tubes in the second set being aligned with their respective slots, thereby flowing charge air through the aligned tubes, based on one or more of a mass air flow rate and a temperature at an outlet of the charge air cooler.

18. The air flow regulating system of claim 1, wherein the barrel valve has a circular cross-section and wherein the series of staggered slots are overlapping and arranged in parallel with one another.

19. The method of claim 5, wherein adjusting the position of the barrel valve to progressively cover and uncover the increasing amount of tubes in the second set of cooling tubes includes rotating the barrel valve, starting from a fully open position, in a first direction to cover a first tube in the second set of cooling tubes and further rotating the barrel valve in the first direction to cover a second tube in the second set of cooling tubes, while the first tube remains covered by the barrel valve.

20. The method of claim 5, wherein adjusting the position of the barrel valve to progressively cover and uncover the increasing amount of tubes in the second set of cooling tubes includes rotating the barrel valve, starting from a fully closed position, in a second direction to uncover a first tube in the second set of cooling tubes and further rotating the barrel valve in the second direction to uncover a second tube in the second set of cooling tubes, while the first tube remains uncovered by the barrel valve.

* * * * *